(12) United States Patent
Risvik et al.

(10) Patent No.: US 11,803,596 B2
(45) Date of Patent: Oct. 31, 2023

(54) EFFICIENT FORWARD RANKING IN A SEARCH ENGINE

(71) Applicant: MICROSOFT TECHNOLOGY LICENSING, LLC, Redmond, WA (US)

(72) Inventors: Knut Magne Risvik, Mo i Rana (NO); Michael Hopcroft, Kirkland, WA (US); John G. Bennett, Bellevue, WA (US); Karthik Kalyanaraman, Bellevue, WA (US); Trishul Chilimbi, Seattle, WA (US); Chad P. Walters, Bellevue, WA (US); Vishesh Parikh, Redmond, WA (US); Jan Otto Pedersen, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 661 days.

(21) Appl. No.: 16/590,172

(22) Filed: Oct. 1, 2019

(65) Prior Publication Data

US 2020/0192948 A1 Jun. 18, 2020

Related U.S. Application Data

(63) Continuation of application No. 14/325,871, filed on Jul. 8, 2014, now Pat. No. 10,437,892, which is a continuation of application No. 12/951,815, filed on Nov. 22, 2010, now Pat. No. 9,424,351.

(51) Int. Cl.
*G06F 16/00* (2019.01)
*G06F 16/951* (2019.01)
*G06F 16/182* (2019.01)
*G06F 16/2453* (2019.01)
*G06F 16/2457* (2019.01)

(52) U.S. Cl.
CPC .......... *G06F 16/951* (2019.01); *G06F 16/182* (2019.01); *G06F 16/2453* (2019.01); *G06F 16/24578* (2019.01)

(58) Field of Classification Search
CPC .. G06F 16/951; G06F 16/182; G06F 16/2463; G06F 16/24578
See application file for complete search history.

(56) References Cited

U.S. PATENT DOCUMENTS

| | | | | |
|---|---|---|---|---|
| 6,076,051 A | * | 6/2000 | Messerly | G06F 16/3344 707/999.005 |
| 8,175,875 B1 | * | 5/2012 | Dean | G06F 16/355 704/9 |
| 2011/0113064 A1 | * | 5/2011 | Govindachetty | G06F 16/9537 707/771 |

* cited by examiner

*Primary Examiner* — Paul Kim
(74) *Attorney, Agent, or Firm* — SHOOK, HARDY & BACON L.L.P.

(57) ABSTRACT

Methods and computer storage media are provided for generating entries for documents in a forward index. A document and its document identification are received, in addition to static features that are query-independent. The document is parsed into tokens to form a token stream corresponding to the document. Relevant data used to calculate rankings of document is identified and a position of the data is determined. The entry is then generated from the document identification, the token stream of the document, the static features, and the positional information of the relevant data. The entry is stored in the forward index.

20 Claims, 5 Drawing Sheets

EFFICIENT FORWARD RANKING IN A SEARCH ENGINE

CROSS-REFERENCE TO RELATED APPLICATIONS

This application is a continuation of U.S. patent application Ser. No. 14/325,871 filed Jul. 8, 2014, entitled "EFFICIENT FORWARD RANKING IN A SEARCH ENGINE", which is a continuation of and claims priority from U.S. patent application Ser. No. 12/951,815, filed Nov. 22, 2010, entitled "HYBRID-DISTRIBUTION MODEL FOR SEARCH ENGINE INDEXES," each of which are incorporated herein by reference in their entirety. This application includes subject matter from U.S. Pat. No. 8,713,024, entitled "EFFICIENT FORWARD RANKING IN A SEARCH ENGINE," previously incorporated by reference in U.S. patent application Ser. No. 12/951,815; U.S. Pat. No. 8,713,024, entitled "EFFICIENT FORWARD RANKING IN A SEARCH ENGINE," is incorporated herein by reference in its entirety.

BACKGROUND

The amount of information and content available on the Internet continues to grow very fast. Given the vast amount of information, search engines have been developed to facilitate searching for electronic documents. In particular, users may search for information and documents by entering search queries comprising one or more terms that may be of interest to the user. After receiving a search query from a user, a search engine identifies documents and/or web pages that are relevant based on the search query. Because of its utility, web searching, that is, the process of finding relevant web pages and documents for user issued search queries has arguably become the most popular service on the Internet today.

Further, search engines typically use a one-step process that utilizes a search index to identify relevant documents to return to a user based on a received search query. Search engine ranking functions, however, have emerged into very complex functions that can be both time consuming and expensive if used for every document that is indexed. Additionally, the storage of data needed for these complex formulas can also present issues, especially when stored in reverse indexes that are typically indexed by words or phrases. The extraction of relevant data needed for the complex formulas, when stored in reverse indexes, is inefficient.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to the generation and use of a forward index used to rank documents as a result of a search query. In one embodiment, the use of the forward index in the ranking process is a final stage such that a previous stage of the ranking process utilizes a reverse index to preliminarily identify documents that may be relevant to the search query. Because the final stage utilizing the forward index may be more time-consuming and costly in some instances, it may be used for a limited number of documents that have previously been identified as being relevant to the search query. The forward index generally comprises a plurality of entries, each entry being associated with a particular document. Exemplary information that may be included in the forward index for each entry is a token stream of the document, an indication as to where in the token stream various contexts are located (e.g., title, URL, body), static features associated with the document, and a position index indicating the location of relevant data in the forward index. As mentioned, the forward index may be used on its own or as a stage, such as a final stage, in a ranking process for ranking documents based on a search result.

BRIEF DESCRIPTION OF THE DRAWINGS

The present invention is described in detail below with reference to the attached drawing figures, wherein.

DETAILED DESCRIPTION

Figure 1:
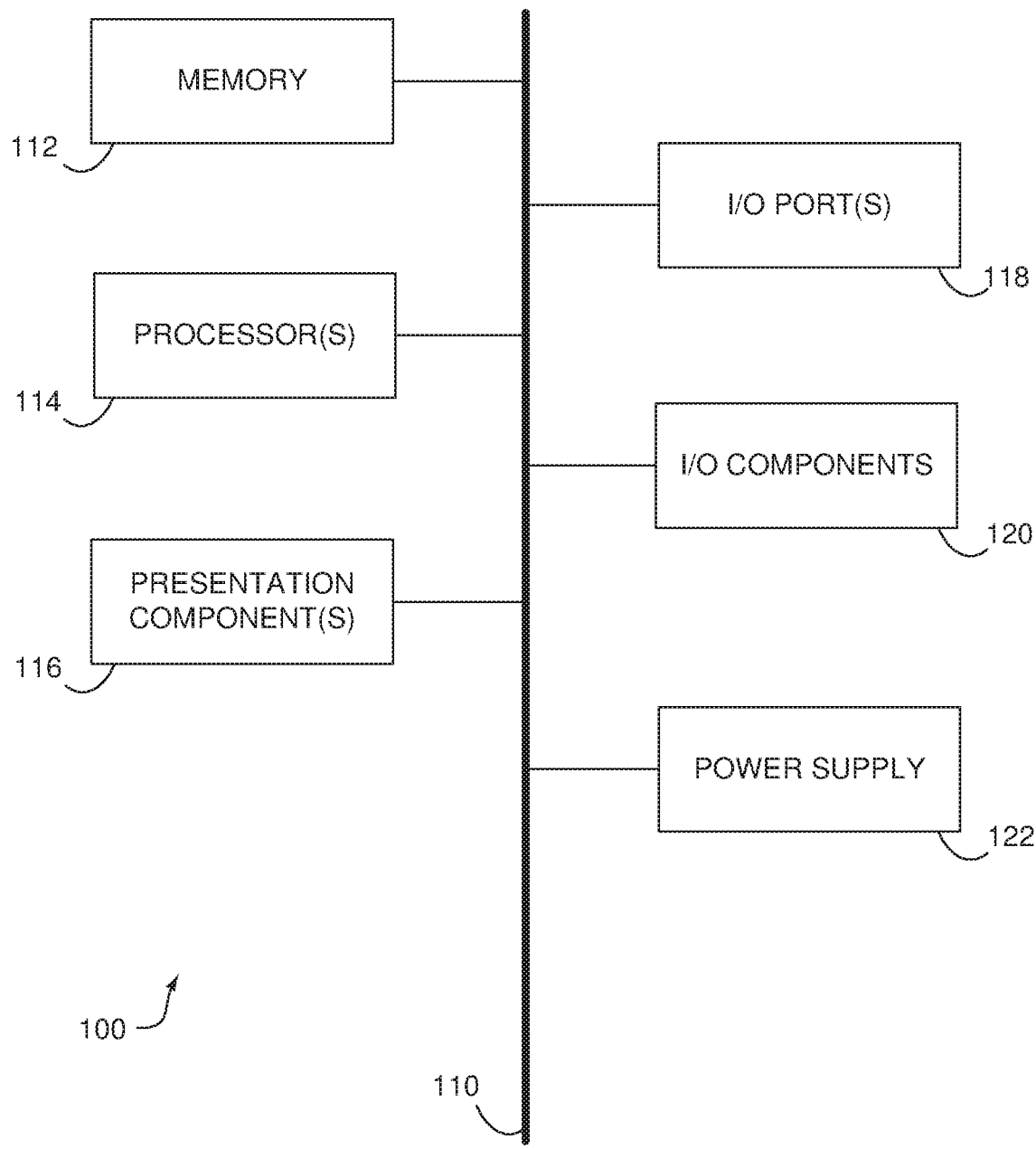
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As noted above, embodiments of the present invention provide a forward index that, in one embodiment, is used as a stage in a multistage document ranking process. For instance, a first stage may comprise the use of a reverse index to identify a plurality of documents that are relevant to the received query. These documents are then used in a second stage of the ranking process that utilizes a forward index, as described herein. The forward index is an index comprised of a plurality of entries, each associated with a document. As such, the forward index is indexed by document and includes various types of data, such as a compressed version of a token stream corresponding to the document, compressed separate streams of various context portions of the document (e.g., body, title, URL), document-specific data associated with static features of the document, positional information associated with relevant data that is frequently used in feature extraction from the forward index, and the like.

Accordingly, in one aspect, an embodiment of the present invention is directed to a method for generating an entry in a forward index. The method includes receiving a document and a corresponding document identification and receiving one or more static features associated with the document. The one or more static features are unrelated to a search query. Further, the method includes parsing the document into tokens to form a token stream of the document, determining positional information from a position in the document of one or more relevant data, and generating the entry from the document identification, the token stream of the document, the static features, and the positional information. The method additionally includes storing the entry in the forward index.

In another embodiment, an aspect of the invention is directed to a method for using a forward index to extract information for ranking documents based on a search query. The method includes receiving a search query, parsing the search query to identify one or more atoms, and creating a token map of query tokens using the one or more atoms parsed from the search query. For a first document, the method includes identifying, in a first entry of a forward index, document tokens in a token stream corresponding to the first document that match the query tokens in the token map. For the document tokens that match the query tokens, the method further includes updating a data structure with a position in the token stream corresponding to the first document of each of the document tokens that match the query tokens. Additionally, the method includes utilizing data in the data structure and extracting ranking information for ranking calculations from the first entry of the forward index.

A further embodiment of the invention is directed to one or more computer storage media having stored thereon a data structure for storing data representing a forward index that is used to rank search results based on a search query. The data source includes a first data field containing document identification information that identifies a particular document and a second data field containing a compressed token stream of the document. The data structure additionally includes a third data field containing document-specific data representing static features of the document that are used to rank the document when a query is received and a fourth data field containing positional information that indicates the position of one or more relevant data associated with the document that is frequently used to calculate a ranking of the document.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
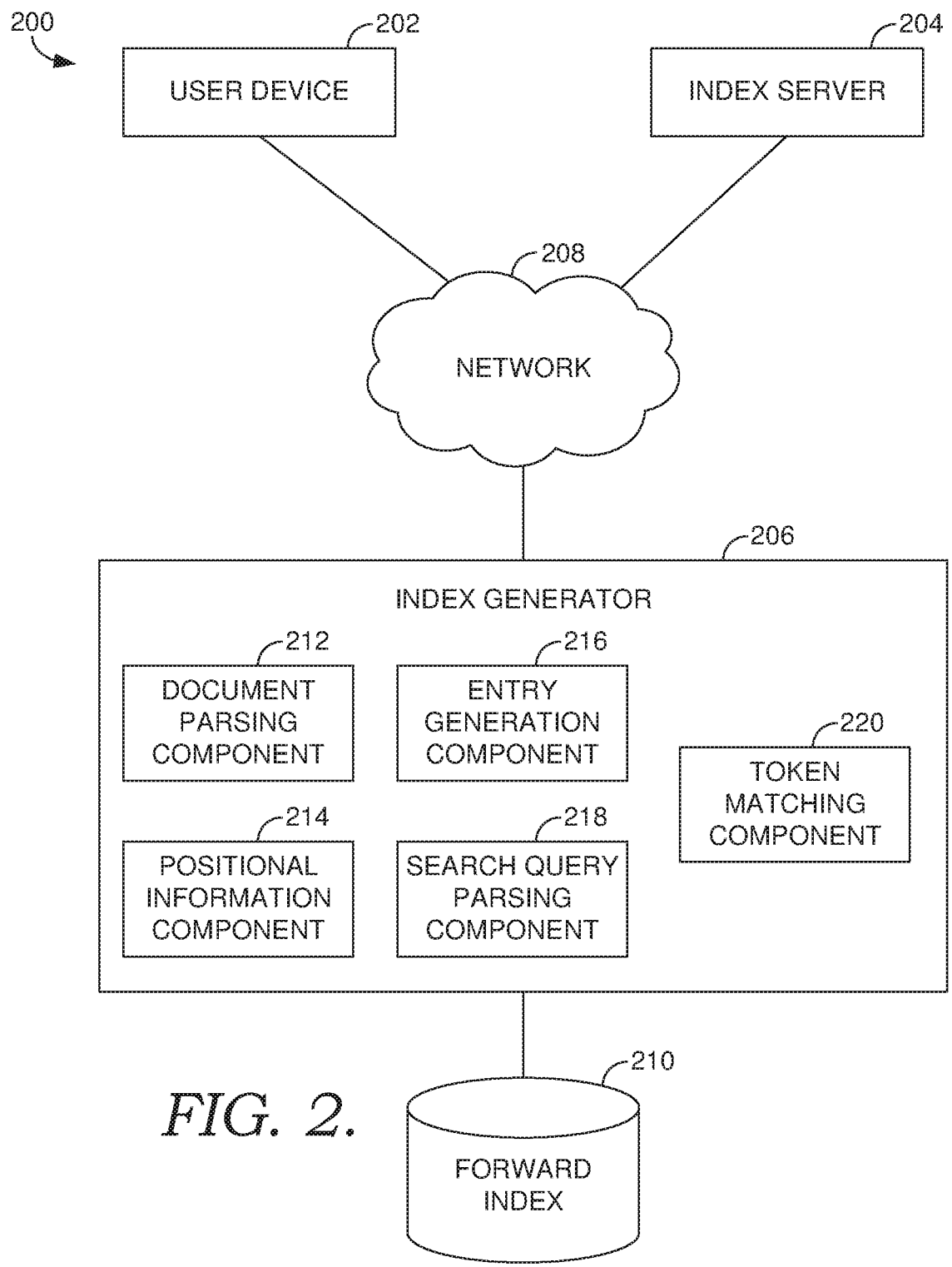
FIG. 2 is a block diagram of an exemplary system in which embodiments of the invention may be employed.

Referring now to FIG. 2, a block diagram is provided illustrating an exemplary system 200 in which embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 200 includes a user device 202, an index server 204, an index generator 206, and a forward index 210. Each of the components shown in FIG. 2 may be any type of computing device, such as computing device 100 described with reference to FIG. 1, for example. The components may communicate with each other via a network 208, which may include, without limitation, one or more local area networks (LANs) and/or wide area networks (WANs). Such networking environments are commonplace in offices, enterprise-wide computer networks, intranets, and the Internet. It should be understood that any number of user devices, index servers, and index generators may be employed within the system 200 within the scope of the present invention. Each may comprise a single device or multiple devices cooperating in a distributed environment. For instance, the index generator 206 may comprise multiple devices arranged in a distributed environment that collectively provide the functionality of the index generator 206 described herein. Additionally, other components not shown may also be included within the system 200, while components shown in FIG. 2 may be omitted in some embodiments.

The user device 202 may be any type of computing device owned and/or operated by an end user that can access network 208. For instance, the user device 202 may be a desktop computer, a laptop computer, a tablet computer, a mobile device, or any other device having network access. Generally, an end user may employ the user device 202 to, among other things, access electronic documents maintained by index servers, such as the index server 204. For instance, the end user may employ a web browser on the user device 202 to access and view electronic documents from the index server 204.

The index server 204 may be any type of server device capable of hosting electronic documents and serving the electronic documents to computing devices such as the user device 202. For instance, the index server 204 may be a web server maintaining web pages.

The index generator 206 may be any type of computing device capable of generating indexes, such as forward index 210. As shown in FIG. 2, the index generator 206 includes a document parsing component 212, a positional information component 214, an entry generation component 216, a search query parsing component 218, and a token matching component 220. Further, in one embodiment, the index generator 206 includes a crawler that is employed to crawl web pages maintained by index servers and index data from the web pages in a search index, such as the forward index 210. When users submit search queries to a search engine, the search engine may utilize the forward index 210 to rank documents. In embodiments, utilizing the forward index 210 is one step in a series of steps used to rank documents to provide the most relevant search results. For instance, in one embodiment, both a reverse index and a forward index are used in an overall process to rank documents.

The search index employed by embodiments of the present invention indexes higher order primitives or "atoms" from documents, as opposed to simply indexing single terms. As used herein, an "atom" may refer to a variety of units of a query or a document. These units may include, for example, a term, an n-gram, an n-tuple, a k-near n-tuple, etc. A term maps down to a single symbol or word as defined by the particular tokenizer technology being used. A term, in one embodiment is a single character. In another embodiment, a term is a single word or grouping of words. An n-gram is a sequence of "n" number of consecutive or almost consecutive terms that may be extracted from a document. An n-gram is said to be "tight" if it corresponds to a run of consecutive terms and is "loose" if it contains terms in the order they appear in the document, but the terms are not necessarily consecutive. Loose n-grams are typically used to represent a class of equivalent phrases that differ by insignificant words (e.g., "if it rains I'll get wet" and "if it rains then I'll get wet"). An n-tuple, as used herein, is a set of "n" terms that co-occur (order independent) in a document. Further, a k-near n-tuple, as used herein, refers to a set of "n" terms that co-occur within a window of "k" terms in a document. Thus, an atom is generally defined as a generalization of all of the above. Implementations of embodiments of the present invention may use different varieties of atoms, but as used herein, atoms generally describes each of the above-described varieties.

The forward index, as used herein, is a type of search index that is sorted by document identifications such that when a document identification is known, other information associated with the document can be easily located. The forward index, in one embodiment, is used as a last stage of ranking such that one or more document identifications that are thought to be relevant to a query are known at the time that the forward index is accessed. The forward index is used to validate previous scoring, in addition to retrieve features that are used for this stage of ranking to score documents. Various types of information can be stored in a forward index. For exemplary purposes only, some of the information that may be stored in a forward index in association with a particular document may include a compressed version of a token stream of the document, a compressed separate stream for context of the document (e.g., title, URL, body), document specific data for static features, and a position index for important data that is frequently used in feature extraction from the forward index entries. For instance, words in a document may be enumerated and listed in a sequence, and then compressed. In one embodiment, the context of a document (e.g., title, URL, body) may be stored as separate streams as mentioned above, but in other embodiments, the forward index may simply show the position in the token stream of a document where the title begins, the position where the body begins, etc. Static features, as used herein, are those features that are not dependent on a query. These may include, for instance, page rank, language, total anchor count, and type of page.

In one embodiment, all documents that are stored on a single computer or machine are assembled together. A document identification to a position map is used to identify the starting location of each document. For instance, if a document with the identification of "3" is needed, a document to position map may be accessed to determine that the document is at position 8500. If that position is accessed, the compressed token stream and other information associated with that document can be found. Further, in one instance, the forward index may be sized such that a conventional matching algorithm can go through the entire compressed token stream and extract required features for ranking on the fly. Each entry associated with a particular document in the forward index may take up approximately one to three kilobytes (kB) such that it is possible to put the documents and related information into a more efficient storage system. In some instances, an entry or document may consume more than three kB, depending on the length and complexity of the document.

As mentioned above, the forward index may be used as a portion of a larger process for ranking documents. In some embodiments, the search engine may employ a staged process to select search results for a search query, such as the staged approach described in U.S. patent application No. (not yet assigned), entitled "MATCHING FUNNEL FOR LARGE DOCUMENT INDEX." For instance, a funnel process may be used that evaluates and prunes away document candidates in multiple stages. The stages each progress as the evaluation of the query becomes more and more complex. In one embodiment, a first stage utilizes a reverse index, which is sorted by atoms (e.g., words, terms) to first limit the number of documents that are the potential best matches for a received search query. A second ranking process, in this embodiment, then uses a forward index, which is sorted by document identification, to further pair down the number of relevant documents to just those documents that are found to be the most relevant in relation to the received search query. In one instance, the second ranking process that utilizes the forward index is also the more expensive of the ranking processes, and thus is used on an already paired down set of documents, as it is more time-consuming and expensive.

Even more specifically, the overall ranking process is employed when a search query is received to pair the quantity of matching documents down to a manageable size. When a search query is received, the search query is analyzed to identify atoms. The atoms are then used during the various stages of the overall ranking process. These stages may be referred to as the L0 stage (matching stage) to query the search index (e.g., reverse index) and identify an initial set of matching documents that contain the atoms from the search query. This initial process may reduce the number of candidate documents from all documents indexed in the search index to those documents matching the atoms from the search query. For instance, a search engine may search through millions or even trillions of documents to determine those that are most relevant to a particular search query. Once the L0 matching stage is complete, the number of candidate documents is greatly reduced. Many algorithms for locating the most relevant documents, however, are costly and time consuming. As such, two other stages may be employed, including a preliminary ranking stage and a final ranking stage.

The preliminary ranking stage, also termed the L1 stage, employs a simplified scoring function used to compute a preliminary score or ranking for candidate documents retained from the L0 matching stage described above. Preliminary rankings are provided for each of the candidate documents retained from the L0 matching stage. The preliminary ranking stage is simplified when compared to the final ranking stage as it employs only a subset of the ranking features used by the final ranking stage. For instance, one or more, but likely not all, of the ranking features used in the final ranking stage are employed by the preliminary ranking stage. Additionally, features not employed by the final ranking stage may be employed by the preliminary ranking stage. In embodiments of the present invention, the ranking features used by the preliminary ranking stage do not have atom-interdependencies, such as term closeness and term cooccurrence. For example, the ranking features used in the preliminary ranking stage may include, for exemplary purposes only, static features and dynamic atom-isolated components. Static features, generally, are those components that only look into features that are query-independent. Examples of static features include page rank, spam ratings of a particular web page, etc. Dynamic atom-isolated components are components that only look at features that are related to single atoms at a time. Examples may include, for instance, BM25f, frequency of a certain atom in a document, location (context) of the atom in the document (e.g., title, URL, anchor, header, body, traffic, class, attributes), etc.

Once the number of candidate documents has again been reduced by the preliminary ranking stage, the final ranking stage, also termed the L2 stage, ranks the candidate documents provided to it by the preliminary ranking stage. The algorithm used in conjunction with the final ranking stage is a more expensive operation with a larger number of ranking features when compared to the ranking features used in the preliminary ranking stage. The final ranking algorithm, however, is applied to a much smaller number of candidate documents. The final ranking algorithm provides a set of ranked documents, and search results are provided in response to the original search query based on the set of ranked documents.

Returning to FIG. 2, a variety of different algorithms may be employed to both generate the forward index 210 and utilize the forward index 210 to rank documents. For instance, an exemplary algorithm may include one or more of the following steps. Initially, a token map is built of all the atoms in a search query that has been received from a user. Each atom may be tagged with a corresponding preferred context stream. Context streams, as used herein, are various portions or types of contexts associated with a document and may include, for exemplary purposes only, title, anchor, headers, body, traffic, classes, attributes, URL, etc. Once a token map is built, the token stream of the forward index entry corresponding to a particular document is scanned. When a token matches the query atom token map, a structure, such as a data structure, is updated. The structure holds token positions for the atoms in the query. Upon completion of scanning the forward index entry, a table that has the contexts and positions for each atom in the query is completed. For all ranking features to extract from the forward index, the position map is used along with dictionary statistics that are annotated in the query to extract the values for the ranking calculations.

As mentioned, the index generator 206 includes a document parsing component 212, a positional information component 214, an entry generation component 216, a search query parsing component 218, and a token matching component 220. Other components are contemplated to be within the scope of the present invention. Generally, the document parsing component 212 is responsible for parsing documents into tokens to form a token steam of the document. Documents are parsed into tokens when an entry for that document is being generated for storage in the forward index 210. Tokens may represent a single alphanumeric character (e.g., letter, number, symbol), or may represent a word or phrase. The positional information component 214 determines positional information from a position in a document of relevant data. Data is considered relevant when it is frequently used in feature/data extraction from the entries in the forward index. A position may comprise a number of characters into the token stream from the beginning of the token stream. The entry generation component 216 is responsible for generating individual entries in the forward index 210. For instance, the entry generation component 216 may take a token stream of a document, the document's identification, positional information of relevant data, and static features and use this information to generate an entry for a particular document.

The search query parsing component 218 is utilized when a search query is received form a user. When a search query is received, the search query may be reformulated by identifying atoms in the search query and generating a reformulated query based on the identified atoms. More particularly, when a search query is received via a user interface, the query is reformulated from its free text form into a format that facilitates querying the search index based on how data is indexed in the search index. In embodiments, the terms of the search query are analyzed to identify atoms that may be used to query the search index. The atoms may be identified using similar techniques that are used to identify atoms in documents when indexing the documents in the search index, which may be performed by the document parsing component 212. For instance, atoms may be identified based on the statistics of terms and query distribution information. Query tokens may be generated from the search query such that a token map can be constructed. Lastly, the token matching component 220 scans a token stream of a particular document to identify any document tokens that match the query tokens.

Figure 3:
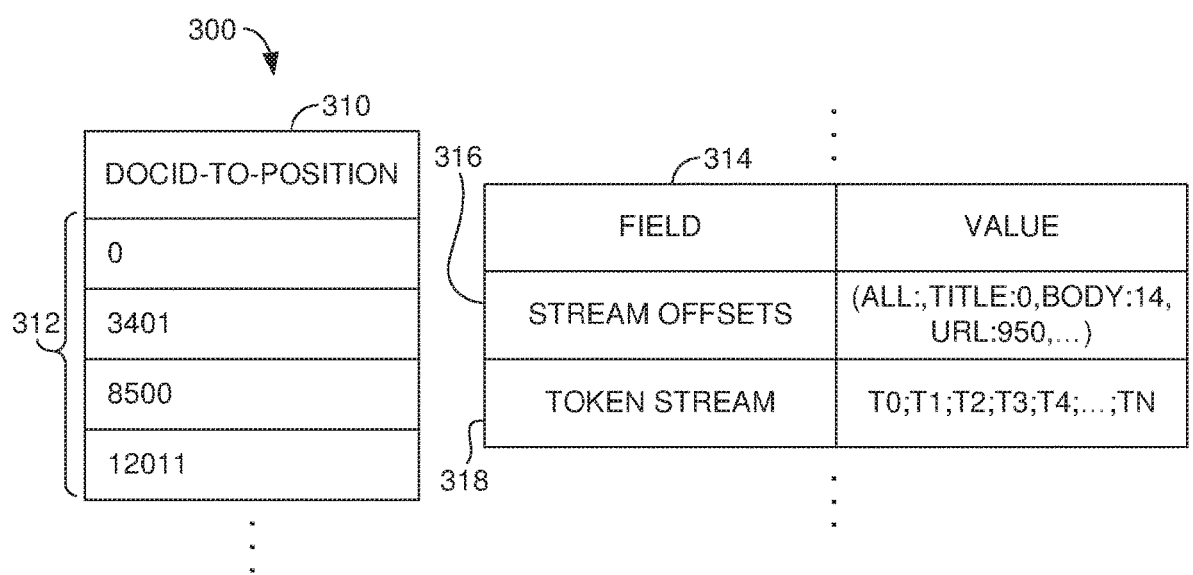
FIG. 3 is an exemplary data structure of an entry in a forward index, in accordance with embodiments of the present invention.

Turning now to FIG. 3, an exemplary data structure 300 is shown of an entry in a forward index, in accordance with embodiments of the present invention. Initially, the data structure of FIG. 3 illustrates various data fields. These data fields generally include a first, a second, a third, and a fourth data field, although more or less than four data fields are also contemplated to be within the scope of the present invention. The first data field includes document identification information that identifies a particular document. For instance, FIG. 3 illustrates several document identifications 312 in the "DOCID-TO-POSITION" column 310. This is just a sampling of document identifications that would be contained in a forward index, as indicated by the ellipses underneath the last listed document identification. Each document identification may be considered an entry in the forward index. In one embodiment, there is a pointer for each entry that points to a location in storage as to where the document is located. Here, the information listed above that is typically in a forward index may either be in the forward index itself, or may be in storage and the pointer would point to this location.

As shown in FIG. 3, for each document identification entry in the forward index, additional information 314 is shown. Documents can be viewed as a stream of tokens with attributes. For instance, here, stream offsets 316 and a token stream 318 of the document are included. Here, a second data field in the data structure of FIG. 3 illustrates a token stream 318 of a document, which is a way of storing characters or words of a document for easy retrieval. In one embodiment, each character of a document is tokenized such that each character of the document has a corresponding token. In one instance, this token stream 318 is compressed for storage purposes.

In addition to the token stream 318, the additional information 314 includes stream offsets 316. As mentioned earlier, documents can be divided into a stream of tokens with attributes. The document can be broken down into sections, whereas each section has its defined stream of tokens. The various tokens may include, for exemplary purposes only, a title, anchors, headers, a body, traffic, classes, attributes, and a URL. One or more of these may be included in an entry of a forward index to define the location in the document of each token category. For instance, as shown in FIG. 3 in the stream offset 316, the title begins at token 0, so one would look to the very beginning of the document to locate the title. Further, the body of the document begins at token 14, and the URL is located at token 950. This provides for a fast way of locating tokens that are specified to be located in a certain portion of a document, such as the title, body, etc. In the token stream 318, each token is shown from T0 to TN, N representing the last token in a document, which varies by document. While in one embodiment separate token streams are included in the forward index for one or more of the sections of a document that are listed above, in an alternative embodiment, the stream offsets (as shown in FIG. 3) are included without separate streams.

A title of a document is the stream of tokens holding up the title of the document. For an HTML document, this may map to the title-tag. Anchors include all anchor texts landing on the page as determined by an external compute. The header is a heading inside of a document. The body is the entire document except its title, anchors, and headers. Traffic is a stream used for external signals and content to a document. It is mostly used for click-text signals and match extenders from traffic analysis. Classes are streams used for tagging the document with classifier outputs, or language or region classifications that are mapped to this stream. Attributes are streams used for (tag, integer) pairs for a document to efficiently perform range queries over attributes. A URL is the actual URL of the page and is considered a special stream.

In one embodiment, a third data field is included in the data structure of an entry of a forward index, although not shown in FIG. 3. The third data field contains document-specific data that represents static features of the document that may be used to rank the document when a query is received. Static features may include, for exemplary purposes only, a page rank of the document, a language of the document, total anchor count, type of page, etc. Even further, a fourth data field may be included in the data structure (not shown) that contains positional information indicating the position of one or more relevant data associated with the document that is frequently used to calculate a ranking of the document. A dictionary may be provided per document and may include the most common atoms and their respective positions as a table to potentially speed up retrieval of the ranking values associated with the positions.

Figure 4:
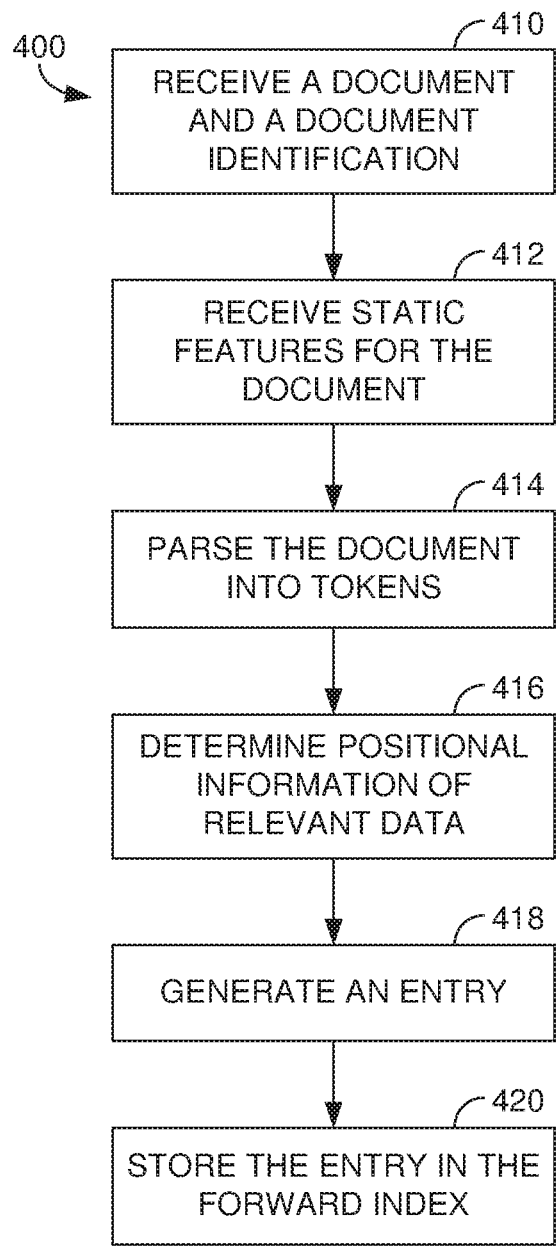
FIG. 4 is a flow diagram showing a method for generating an entry in a forward index, in accordance with embodiments of the present invention.

FIG. 4 is a flow diagram showing a method 400 for generating an entry in a forward index. As mentioned, a forward index contains a plurality of entries sorted by document identification. Initially, a document and a document identification corresponding to the document are received at step 410. The document identification can be preassigned or assigned once the document is received. It can be a random or unique identification, or can be related somehow to the document (e.g., type of document, date received). At step 412, static features associated with the document are received. Static features are those features that are unrelated to any search query. These may include, for exemplary purposes only, a page rank associated with the document, a language of the document, a total anchor count, and a type of page (e.g., informative, entertainment, a white paper). At step 414, the document is parsed into tokens. Here, the tokens of the document form a token stream of the document. In one embodiment, the token stream is compressed. In a further embodiment, one or more context streams that correspond to the document may be identified. These context streams may include, for exemplary purposes only, a title, anchor, header, body, traffic class, attributes, and URL corresponding to the document.

Positional information of relevant data is determined at step 416. The positional information is determined from a position of the relevant data in the document. In some instances, this relevant data is frequently used and extracted from the forward index to rank the documents based on a query, and thus the position of this data is noted in the forward index. Positional information, in one embodiment, is a pointer to a location in storage of the particular relevant data. In another embodiment, positional information is a location in a token stream of that particular data. For instance, positional information may include the relative location of a particular atom in a particular document such that the distance between two atoms (e.g., the same atom) in a document can be computed and used for ranking, as described herein. An entry is generated at step 418. The entry is generated from the document identification, the token stream of the document, the static features, and the positional information. As shown in FIG. 3, the forward index is made up of multiple entries and may take the form of a data structure. At step 420, the entry that was generated at step 418 is stored in the forward index. In one embodiment, that data is compressed in storage.

Figure 5:
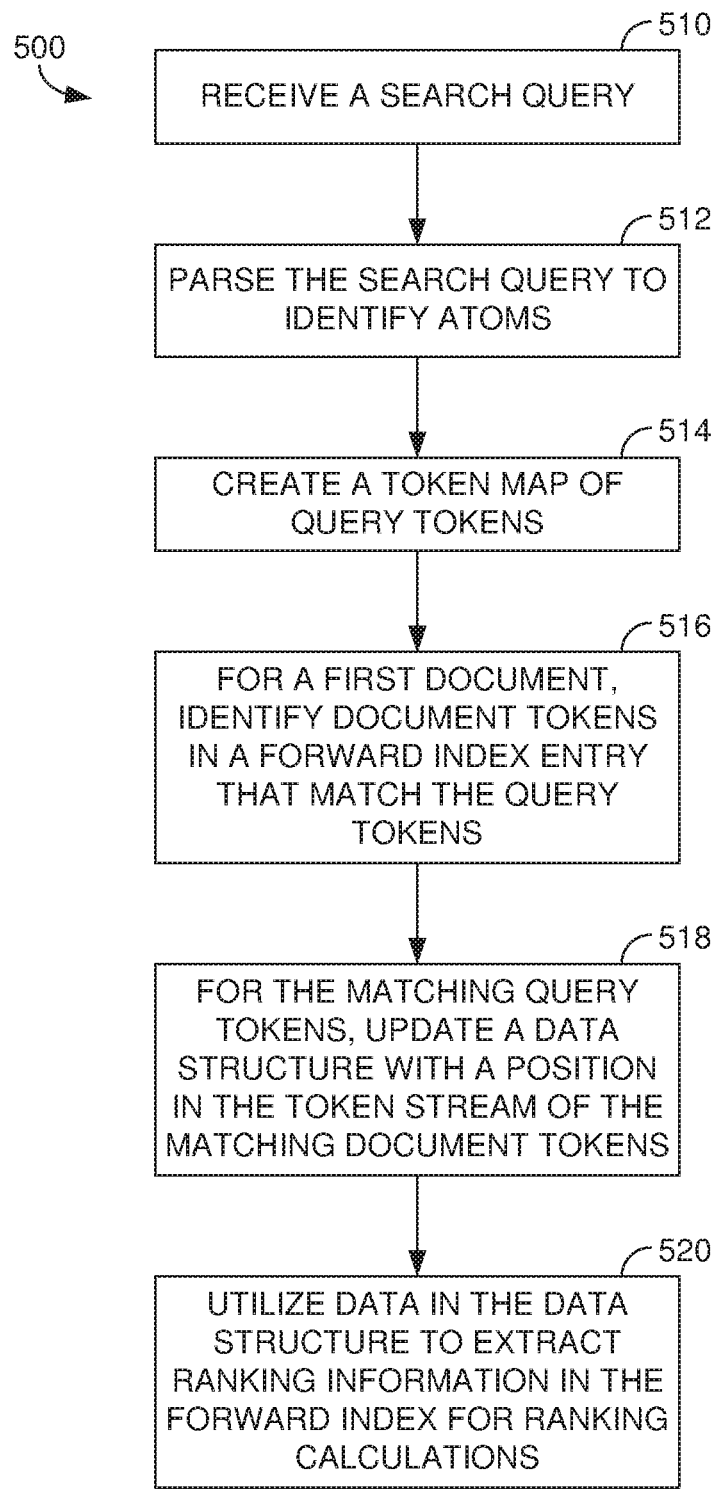
FIG. 5 is a flow diagram showing a method for using a forward index to extract information for ranking documents based on a search query, in accordance with embodiments of the present invention.

As illustrated in FIG. 5, a flow diagram is shown of a method 500 for using a forward index to extract information for ranking documents based on a search query. As previously described, a forward index is an index organized or sorted by documents or document identifications. Initially, a search query is received at step 510. The search query is parsed at step 512 to identify one or more atoms. In one embodiment, each atom is tagged with a preferred context stream, if specified. These context streams may include one or more of a title, anchor, header, body, class, attributes, or URL.

As mentioned, an atom, or an atomic unit, as used herein, may refer to a variety of units of a query or a document. These units may include, for example, a term, an n-gram, an n-tuple, a k-near n-tuple, etc. A term maps down to a single symbol or word as defined by the particular tokenizer technology being used. A term, in one embodiment is a single character. In another embodiment, a term is a single word or grouping of words. An n-gram is a sequence of "n" number of consecutive or almost consecutive terms that may be extracted from a document. An n-gram is said to be "tight" if it corresponds to a run of consecutive terms and is "loose" if it contains terms in the order they appear in the document, but the terms are not necessarily consecutive. Loose n-grams are typically used to represent a class of equivalent phrases that differ by insignificant words (e.g., "if it rains I'll get wet" and "if it rains then I'll get wet"). An n-tuple, as used herein, is a set of "n" terms that co-occur (order independent) in a document. Further, a k-near n-tuple, as used herein, refers to a set of "n" terms that co-occur within a window of "k" terms in a document. Thus, an atom is generally defined as a generalization of all of the above. Implementations of embodiments of the present invention may use different varieties of atoms, but as used herein, atoms generally describe each of the above-described varieties.

At step 514, a token map of query tokens is created from the atoms parsed from the search query at step 512. As such, the atoms parsed from the query are tokenized into a series of tokens. The token map, in one embodiment, also includes a particular context for one or more of the query tokens. For a first document, document tokens in an entry corresponding to the first document in the forward index are scanned to determine if any of the query tokens match the document tokens. At step 516, in a forward index, document tokens that match the query tokens in the token map are identified from a token stream corresponding to the first document. At step 518, a data structure is updated with the matching tokens. In one instance, the data structure is updated with a position in the first document's token stream of each of the matching tokens. The data in the data structure is then utilized at step 520 to extract ranking information from the first entry of the forward index for ranking calculations. The first entry is associated with the first document. Ranking information may include a position in the token stream of the first document corresponding to the document tokens that match the query tokens in the query map.

In one embodiment, other documents are indexed according to the steps described above in relation to FIG. 5. For instance, for a second document, document tokens may be identified in the token stream of the second document that match the query tokens in the token map. For those document tokens that match, the data structure is updated with the position in the second document's token stream of each of the document tokens. Utilizing the data in the data structure, ranking information can be extracted from the second entry in the forward index associated with the second index. The second entry is associated with the second document.

In a further embodiment, as previously mentioned, the use of the forward index to extract information for ranking documents based on a search query may be a secondary or even a tertiary stage of an overall ranking process. For instance, given that the forward index is indexed by document (e.g., document identification), a plurality of documents may have previously been identified at a previous stage of the ranking process such that the previous stage may have identified one or more documents as being relevant to the search query. These documents are the ones that are further processed using the information stored in the forward index, as described herein.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method, the method comprising:
receiving a search query comprising one or more atoms;
based on the one or more atoms, identifying query tokens for the search query;
creating a token map of query tokens using the one or more atoms from the search query;
tagging each of the one or more atoms with a context stream;
generating a token position data structure using both the query tokens in the token map and a plurality of documents that are identified as relevant to the search query, wherein the token position data structure includes token positions of document tokens corresponding to the plurality of documents, wherein the document tokens match the query tokens, wherein the token position data structure stores the token positions in association with the one or more atoms in the search query;
accessing the token position data structure associated with the query tokens and the document tokens corresponding to the plurality of documents;
extracting ranking information from the token position data structure; and
based on the ranking information extracted from the token position data structure, executing ranking calculations for the plurality of documents associated with the search query based on the one or more atoms, wherein a document of the plurality of documents is ranked based on a context stream of an atom that corresponds to the document.

2. The method of claim 1, further comprising:
parsing the search query to identify the one or more atoms.

3. The method of claim 2, wherein the context stream is selected from the following available context streams: a title, anchor, header, body, traffic, class, attributes, and uniform resource locator (URL).

4. The method of claim 2, further comprising:
for a first document that is identified as relevant to the search query, identifying in a first entry of a forward index document tokens in a token stream corresponding to the first document, wherein the document tokens match the query tokens in the token map; and
for the document tokens that match the query tokens based on the one or more atoms, updating the token position data structure, wherein the token position data structure includes token positions in the token stream of document tokens that match the query tokens for the first document.

5. The method of claim 1, wherein the ranking information includes the token positions in the token stream of the first document corresponding to the document tokens that match the query tokens.

6. The method of claim 2, wherein the plurality of documents are in a forward index; and wherein the plurality of documents are identified as relevant documents to the search query based on a reverse index that is indexed by atoms.

7. The method of claim 6, wherein the forward index further comprises, for a selected document in the forward index, a compressed token stream, wherein the compressed token stream is a compressed version of a token stream of the document.

8. One or more computer-storage media having computer-executable instructions embodied thereon that, when executed by a computing system having a processor and memory, cause the processor to:
receiving a search query comprising one or more atoms;
based on the one or more atoms, identifying query tokens for the search query;
creating a token map of query tokens using the one or more atoms from the search query;
tagging each of the one or more atoms with a context stream;
generating a token position data structure using both the query tokens in the token map and a plurality of documents that are identified as relevant to the search query, wherein the token position data structure includes token positions of document tokens corresponding to the plurality of documents, wherein the document tokens match the query tokens, wherein the token position data structure stores the token positions in association with the one or more atoms in the search query;
accessing the token position data structure associated with the query tokens and the document tokens corresponding to the plurality of documents;
extracting ranking information from the token position data structure; and
based on the ranking information extracted from the token position data structure, executing ranking calculations for the plurality of documents associated with the search query based on the one or more atoms, wherein a document of the plurality of documents is ranked based on a context stream of an atom that corresponds to the document.

9. The media of claim 8, further comprising:
parsing the search query to identify the one or more atoms.

10. The media of claim 9, wherein the context stream is selected from the following available context streams: a title, anchor, header, body, traffic, class, attributes, and uniform resource locator (URL).

11. The media of claim 9, further comprising:
for a first document that is identified as relevant to the search query, identifying in a first entry of a forward index, document tokens in a token stream corresponding to the first document, wherein the document tokens match the query tokens in the token map; and
for the document tokens that match the query tokens based on the one or more atoms, updating the token position data structure, wherein the token position data structure includes token positions in the token stream of document tokens that match the query tokens for the first document.

12. The media of claim 9, wherein the ranking information includes the token positions in the token stream of the first document corresponding to the document tokens that match the query tokens.

13. The media of claim 9, wherein the plurality of documents are in a forward index; and wherein the plurality of documents are identified as relevant documents to the search query based on a reverse index that is indexed by atoms.

14. The media of claim 13, wherein the forward index further comprises, for a selected document in the forward index, a compressed token stream wherein the compressed token stream is a compressed version of a token stream of the document.

15. A computerized system comprising:
computer memory storing computer-useable instructions that, when used by the one or more computer processors, cause the one or more computer processors to perform operations comprising:
receiving a search query comprising one or more atoms;
based on the one or more atoms, identifying query tokens for the search query;
creating a token map of query tokens using the one or more atoms from the search query;
tagging each of the one or more atoms with a context stream;
generating a token position data structure using both the query tokens in the token map and a plurality of documents that are identified as relevant to the search query, wherein the token position data structure includes token positions of document tokens corresponding to the plurality of documents, wherein the document tokens match the query tokens, wherein the token position data structure stores the token positions in association with the one or more atoms in the search query;
accessing the token position data structure associated with the query tokens and the document tokens corresponding to the plurality of documents;
extracting ranking information from the token position data structure; and
based on the ranking information extracted from the token position data structure, executing ranking calculations for the plurality of documents associated with the search query based on the one or more atoms, wherein a document of the plurality of documents is ranked based on a context stream of an atom that corresponds to the document.

16. The system of claim 15, further comprising:
parsing the search query to identify the one or more atoms.

17. The system of claim 16, wherein the context stream is selected from the following available context streams: title, anchor, header, body, traffic, class, attributes, and uniform resource locator (URL).

18. The system of claim 16, further comprising:
for a first document that is identified as relevant to the search query, identifying in a first entry of a forward index, document tokens in a token stream corresponding to the first document, wherein the document tokens match the query tokens in the token map; and
for the document tokens that match the query tokens based on the one or more atoms, updating the token position data structure, wherein the token position data structure includes token positions in the token stream of document tokens that match the query tokens for the first document.

19. The system of claim 16, wherein the plurality of documents are in a forward index; and wherein the plurality of documents are identified as relevant documents to the search query based on a reverse index that is indexed by atoms.

20. The system of claim 19, wherein the forward index further comprises, for a selected document in the forward index, a compressed token stream, wherein the compressed token stream is a compressed version of a token stream of the document.

* * * * *